US006836764B1

(12) United States Patent
Hucal

(10) Patent No.: US 6,836,764 B1
(45) Date of Patent: *Dec. 28, 2004

(54) TIERED INTEREST RATE REVOLVING CREDIT SYSTEM AND METHOD

(76) Inventor: Stephen J. Hucal, 77 Baby Point Crescent, Toronto, Ontario (CA), M6S 2B7

( * ) Notice: Subject to any disclaimer, the term of this patent is extended or adjusted under 35 U.S.C. 154(b) by 0 days.

This patent is subject to a terminal disclaimer.

(21) Appl. No.: 09/269,461

(22) PCT Filed: Sep. 25, 1997

(86) PCT No.: PCT/US97/17497

§ 371 (c)(1),
(2), (4) Date: Mar. 26, 1999

(87) PCT Pub. No.: WO98/13779

PCT Pub. Date: May 2, 1998

(30) Foreign Application Priority Data

Mar. 18, 1998 (DE) ......................................... 198 11 831
Aug. 7, 1998 (DE) ......................................... 198 35 863

(51) Int. Cl.[7] ............................................. G06F 17/60
(52) U.S. Cl. ............................. 705/40; 705/1; 705/14; 705/35; 705/38; 705/39; 705/40; 705/77; 902/40; 725/5
(58) Field of Search ............................... 705/1, 14, 35, 705/38, 39, 40, 77; 725/5

(56) References Cited

U.S. PATENT DOCUMENTS

| 4,194,242 A | | 3/1980 | Robbins |
| 4,484,217 A | * | 11/1984 | Block et al. .................... 725/1 |
| 4,718,009 A | | 1/1988 | Cuervo |
| 4,736,294 A | | 4/1988 | Gill et al. |
| 4,742,457 A | | 5/1988 | Leon et al. |
| 4,876,648 A | | 10/1989 | Lloyd |
| 5,025,372 A | | 6/1991 | Burton et al. |
| 5,200,889 A | * | 4/1993 | Mori ........................... 705/14 |

FOREIGN PATENT DOCUMENTS

WO    WO 97/27549    *    7/1997    ........... G06F/17/00

OTHER PUBLICATIONS

Dialog file 9 #1138105 "Ansering the call of competition, Amerithech's card adds another Rebate" Credit Card News, p 2, Mar. 1, 1995.*
Dialog file 15 # 00711377, "Ameritceh launches new ad reflecting single brand name" Bank Marketing, v25n5 pp 6, May 1993.*
Yvette D. Kantrow, American Express sets a three–tier pricin on Optima, American Banker, v157, n25, p1(2).*
Stephen Schwarze et al., "Computer Supported Deterministionof Bank Credit COnditions," Computational Intelligence for Financial Enginering, Proceedings o fthe IEEE/IAFE 1996 Conference on New York City, NY, USA Mar. 24–26, 1996, New York, NY, USA IEEE, US, Mar. 24, 1996, pp. 83–89.
Nevada, "Keybank USA's New Credit Card Rewards Repayment," *Akron Beacon Journal* (1996).

* cited by examiner

*Primary Examiner*—Raquel Aluarez
(74) *Attorney, Agent, or Firm*—Luce, Forward, Hamilton & Scripps LLP

(57)    ABSTRACT

A method and a system for operating a revolving credit program utilizing a table of tiered interest rates in which one of the interest rates is applied as a finance charge to a remaining outstanding balance (20) of an account depending upon the percentage that payments made during a billing cycle (12) comprise of an account parameter, such as the outstanding balance, a highest balance or a beginning balance. In the preferred embodiment the applied interest rate (34) is determined by the percentage the outstanding balance (32) is reduced by payments on the balance during a billing cycle. Also in a preferred embodiment of the invention, the tiered interest rate table is structured to apply progressively reduced interest rates to outstanding balances reduced by progressively greater payment percentages from the previous billing cycle, thereby encouraging a credit customer to make larger payments and pay down the outstanding balance faster. Also in the preferred embodiment, the system calculates and displays (42) the minimum payments necessary to reduce the outstanding balance to meet each tier of the interest rate table.

14 Claims, 1 Drawing Sheet

TIERED INTEREST RATE REVOLVING CREDIT SYSTEM AND METHOD

BACKGROUND

This invention relates to methods and systems for operating revolving credit programs and, more specifically, to revolving credit programs in which the interest rate applied to an outstanding balance is varied.

Revolving credit programs typically are offered by banks, savings and loans, federal savings banks, credit unions and other credit providers, and operate to advance funds as cash advances or to pay for purchases made by a customer, such as through a credit card or a personal line of credit, and in some instances to pay for checks written by the customer, or to cover funds provided through other access devices, such as automatic teller machines, telephone communication devices and personal computers. Under such revolving credit programs, the customer enters into an agreement with a credit provider in which the unpaid balance of the customer's loan is assessed a finance charge which represents either a fixed interest rate or a variable interest rate which is tied to the prime rate or some other interest rate index.

Once debt is incurred, the customer generally has three options for repayment of the debt. One option is for the customer to pay the entire outstanding balance and avoid assessment of any interest or finance charges, in the case of purchase transactions. A second option is for the customer to pay a minimum amount required by the credit provider to reduce the amount of the outstanding balance and defer the remaining outstanding balance for later payment. In that case, the customer is assessed interest or finance charges based on the remaining outstanding balance.

Under the third option, the customer pays more than the minimum required by the credit provider but less than the entire outstanding balance. If this alternative is chosen, the customer is assessed interest or finance charges in the same way as the second option.

There presently exist programs in which a tiered interest rate is applied to an outstanding balance. Specifically, different interest rates are applied to various levels of an outstanding balance. Further, systems exist in which different interest rates are applied to varying levels of purchases, or to types of purchases. All such programs are designed to encourage the credit customer to increase purchase volume and/or increase outstanding balance.

Levels of personal debt are reaching record-breaking highs and as a result, credit card delinquency rates are increasing. The ratio of total household debt to disposable income has reached a record high. Accordingly, there is a need for a revolving credit system which provides an incentive to encourage a credit customer to pay off his or her outstanding balance quickly. Furthermore, such a system should be entirely automated and operable on the platform of a personal computer or computer network.

SUMMARY

The present invention is a fully automated system and method for providing a revolving credit program through a credit provider which helps revolving credit customers gain control over their finances and encourages responsible financial management. In a preferred embodiment of the invention, a revolving credit system and method are provided in which the interest rate finance charge applied to the outstanding balance of a customer's account varies according to the percentage of the outstanding balance paid by a customer in a billing cycle. The greater the percentage of the outstanding balance paid off by the customer in a billing cycle, the lower the interest rate applied to the remaining unpaid outstanding balance during the next billing cycle. In the alternative, the interest rate finance charge can be varied according to the percentage of other parameters of the account, such as beginning balance, highest balance or average balance in the billing cycle.

Also in the preferred embodiment, the system and method provides a tiered interest rate structure. For example, if the credit customer pays 2% of the outstanding balance in a billing cycle, the interest applied to the remaining outstanding balance is 16.5%; if the credit customer pays 3% of the outstanding balance, the applied interest rate is reduced to 12.9%; and if the credit customer pays 5% or more of the outstanding balance, the applied interest rate is further reduced to 8.9%. Of course, other interest rates and payment percentages can be applied, as well as different numbers of interest rate "tiers," without departing from the scope of the present invention.

Consequently, the system and method of the present invention is sufficiently flexible to accommodate month-to-month variations in a credit customer's financial situation by offering a number of different payment options. The tiered applied interest rate structure of the invention allows the credit customer to choose his or her minimum payment and interest rate.

The system and method of the preferred embodiment of the present invention also provides a display, which may be on a monitor or in printed form, of the previous outstanding balance, the payments received, the finance charge applied, the new outstanding balance and the minimum payment amounts necessary to qualify the credit customer for each interest rate level.

The system is designed to be operable on a personal computer, or network of personal computers, and includes software having a set of instructions for operating the personal computer. The software is stored on a disk, tape, hard drive or other storage media, and is loaded into the memory of the computer from storage during use. All information pertaining to the account is kept in storage in the computer, as is the table of percentages and corresponding interest rates. Each transaction, whether it is a payment or a debit to the account, is also entered and stored for each account.

The system is adaptable to be used with credit card programs, home equity loan programs, and unsecured lines of credit, to consumers for personal, family and household purposes, as well as to business entities for business, agricultural, and governmental uses.

Accordingly, it is an object of the present invention to provide a system and method for operating a revolving credit program; a system and method for operating a revolving credit program which encourages a credit customer to pay off an outstanding account balance quickly; a system and method for operating a revolving credit program having a tiered interest rate structure such that a lower interest rate is applied to a remaining outstanding balance in response to higher balance percentage pay off in a billing period; and a system and method for operating a revolving credit program which runs from a personal computer and/or network platform.

Other objects and advantages of the present invention will be apparent from the following description, accompanying drawing and the appended claims.

BRIEF DESCRIPTION OF THE DRAWING

The FIGURE is a flow chart showing the operation of the method of the present invention on a personal computer or computer network.

DETAILED DESCRIPTION

Figure 1:
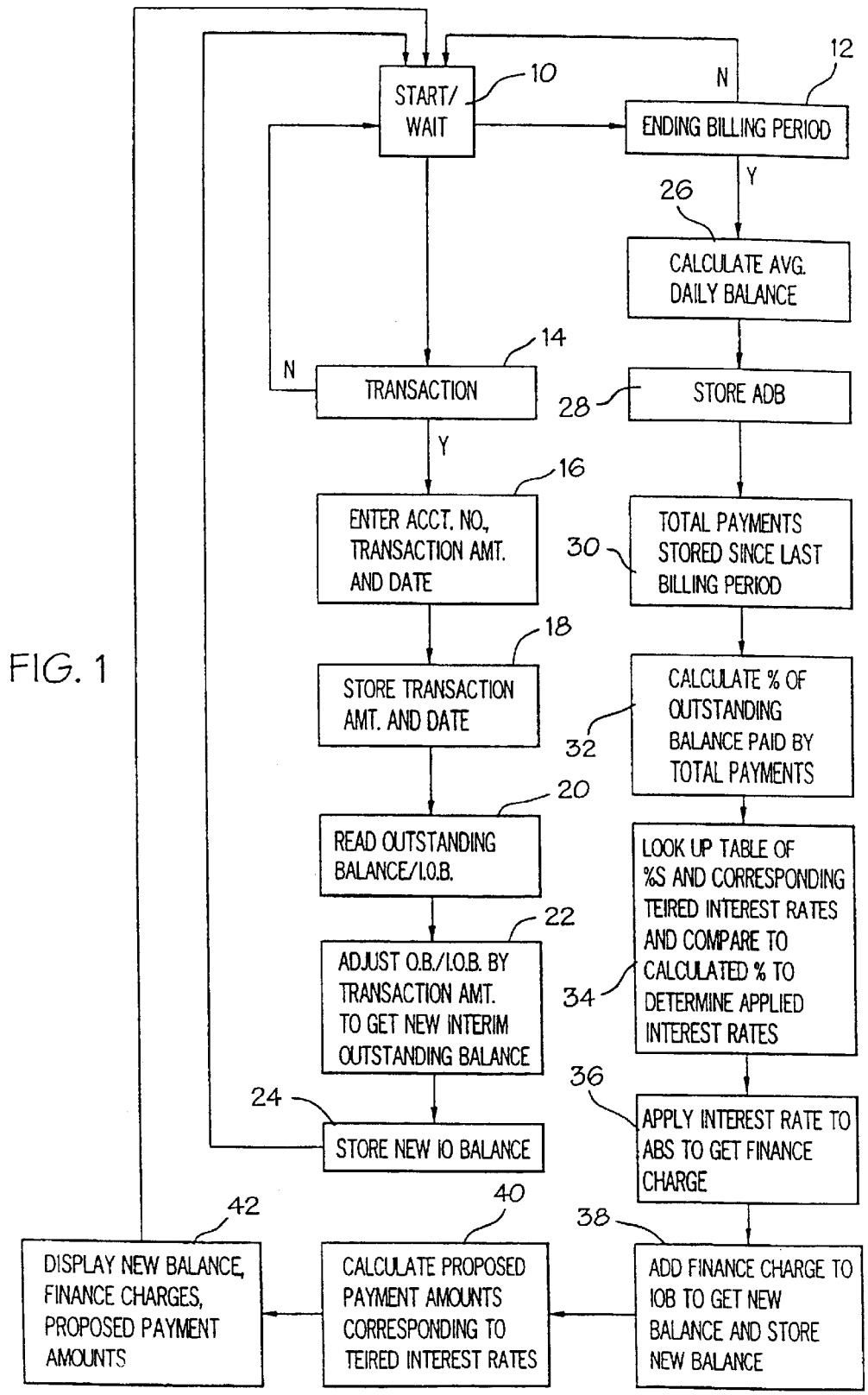

The FIGURE shows a flow chart which represents the operation of a personal computer or computer network programmed to embody the system of the present invention and to perform the method of the present invention. The instructions for performing the process of the system preferably are in the form of computer software which is kept in a storage medium, such as a disk, tape, hard drive or the like. The software is loaded into computer memory from storage when the program is to be implemented.

The Functional block 10 represents the "wait state" of the system. The method of the invention is triggered by the occurrence of either the end of a billing period or a transaction being entered into a credit customer's account. In the preferred embodiment, a timing program (not shown) internal to the computer platform operated according to the method of the invention will signal the system of the end of a billing period, which may correspond with the end of a calendar month. Accordingly, functional block 12 indicates that the system is activated at the end of a billing period, or, as shown in block 14, if a transaction is entered. If no transaction occurs, and the end of a billing cycle has not occurred, the system remains in the wait state of block 10.

If there is a transaction, as shown in block 14, the operator or system enters the credit customer's account number, the nature of the transaction (i.e., payment, debit or the like) and the date of the transaction, as shown in block 16. This information is stored in the computer system, as shown in block 18.

The central processing unit of the computer system then reads into memory from storage the current outstanding balance of the credit customer's account, as shown in block 20. Once the current outstanding balance is read into memory, the outstanding balance is adjusted by the transaction amount in order to arrive at a new, interim outstanding balance ("I.O.B."), as shown in block 22. This new interim outstanding balance is then stored in the system, as shown in block 24. The system then returns to the wait state of block 10. This iteration through blocks 10-24 may occur several times in the course of a billing cycle, each time a transaction is entered. A billing cycle typically is a one month or thirty day calendar period, but may be any time period contracted upon by the credit provider and the credit consumer.

At the end of the billing period, shown at block 12, the system is programmed to calculate an average daily balance, shown in block 26. The average daily balance method is a conventional calculation in which the interim outstanding balance at each day of the current billing period is determined, then averaging the daily balances over the billing period. In the alternative, the system may be programmed to calculate finance charges based on ending balance, two cycle average daily balance, and the like, without departing from the scope of the present invention. This average daily balance, or amount calculated using an alternative method as explained above, is then stored in the system, as shown in block 28. In addition, the total payments made during the current billing period are summed and stored, as shown in block 30.

The central processing unit next calculates the percentage the total payments made during the current billing period comprise of the previous month's outstanding balance, or the percentage of balance reduction, as shown in block 32. The unit then reads a stored table of percentages and corresponding tiered interest rates, as shown in block 34, and compares the calculated percentage of balance reduction of block 32 to match it with one of the stored percentages of the table. Each stored percentage on the table has a corresponding interest rate. In the alternative, the system can utilize other customer account parameters, such as comparing the balance reduction to the beginning balance or to the highest balance in the billing cycle to determine a percentage, without departing from the scope of the invention.

The interest rate corresponding to the percentage which matches the percentage of balance reduction calculated in block 32 is then selected as the applied interest rate, all as shown in block 34. The applied interest rate selected in block 34 is then applied to the average daily balance calculated in block 26 and stored in block 28, to arrive at a finance charge, as shown in block 36.

The finance charge is then added into the interim outstanding balance, calculated in block 24, to arrive at a new balance. This new balance value is then stored, as shown in block 38. The new balance then becomes the "outstanding balance" which is read and adjusted pursuant to the process shown in blocks 14-24 in the next billing cycle.

Using the new balance calculated in block 38, the system then calculates the minimum payments necessary to meet the threshold percentages necessary to qualify for the varying tiered interest rates of block 34, as shown in block 40. Finally, a statement (or terminal display) is generated by the system which shows values for the new balance calculated in block 38, the finance charge calculated in block 36, and the proposed minimum payments calculated in block 40 to qualify for each tiered level of interest, as shown in block 42. The statement may contain any or all of this information in addition to other account information and disclosures as required by federal law and subject to change from time to time.

If the display is in the form of a statement, the statement is then sent to the credit customer. Therefore, the credit customer not only receives a current status report of his or her account, showing the current new balance, the finance charge applied and the payments received in the just-completed billing cycle, but the credit customer also receives a schedule of minimum payments necessary to qualify for each tier of reduced interest rates effective for the customer's next billing cycle.

Specific Example

In a specific example, the table of percentages which is read in block 34 may be as follows:

TABLE 1

| Percent of Outstanding Balance Paid | Applied Ann. Int. Rate |
|---|---|
| 5% and over | 8.9% |
| 3% to 4.99% | 12.9% |
| 2% to 2.99% | 16.5% |

If a credit customer has an outstanding balance at the end of a billing period of, for example, $2,000.00 (comprising, for example, principal of $1985.00 and a finance charge of $15.00), and during the course of the subsequent billing period makes a payment on day 14 of that subsequent billing period of $100.00, the balance at the end of that subsequent billing period (before the finance charge is applied) will be $1,900.00, a balance reduction of 5%. Then, according to the Table I set forth above, the credit customer qualifies for an applied annual interest rate of 8.9%, which is a monthly periodic rate of 0.7416%.

This 0.7416% is applied to the average daily balance to arrive at the finance charge. In this example, the average daily balance would be $1936.83, which is arrived at by adding up the outstanding unpaid principal balance for each day of the billing period and dividing the total by the number of days in the billing period (for example, 30 days):

$$\frac{(\$1985.00 \times 13 \text{ days}) + (\$1900.00 \times 17 \text{ days})}{30 \text{ days}} = \$1936.83$$

The finance charge would then be $14.36 ($1,936.83× 0.7416%), making a new balance of $1,914.36. The calculations would be similar for any ending balance representing an outstanding balance reduction of 5% or more, up to but not including full payment of the outstanding balance. Specifically, the same monthly periodic rate would be applied from the table, but the average daily balance, and therefore the finance charge, would be less.

If the credit customer pays only $60.00, which would result in a balance reduction of 3%, according to Table 1, an annual interest rate of 12.9% (which is a monthly periodic rate of 1.075%) is applied to the average daily balance, which would be $1,959.76 (assuming payment of the $60.00 is made on day 14 of the billing cycle), resulting in a finance charge of $21.06, which is added to the interim outstanding balance of $1,940.00, for a new balance of $1961.06. The system would perform similar calculations for any ending balance representing an outstanding balance reduction of at least 3% and up to 5%.

Similarly, if the credit customer pays only 2% of the $2,000.00 outstanding balance, a payment of $40.00, the average daily balance would be $1,970.83 (again assuming the payment of $40.00 is made on day 14 of the billing cycle), and the applied annual interest rate for a 2% balance reduction taken from Table I is 16.5%, a monthly periodic rate of 1.375%. The finance charge is then $27.09. Accordingly, the new balance would be $1,987.09. However, if the credit customer pays less than 2% of the outstanding balance, the same annual interest rate is applied, but that credit customer would be considered delinquent.

Of course, the look-up table represented by Table I above and utilized in block 34 of the Figure can be varied to provide for different numbers of "tiers," or for different interest rates for each percentage tier, or for different percentages of balance reduction without departing from the scope of the present invention.

Applying the values set forth to the display block 42 of FIG. 1, for a 5% balance reduction (i.e., a payment of $100.00 toward an outstanding balance of $2,000.00 in the specific example), the display would include a listing of the new balance of $1,914.36. Furthermore, the display of block 42 would also include a listing of the minimum payments necessary to meet the 5%–3%–2% outstanding balance reduction to qualify for each of the tiered interest rates of 8.9%, 1–2.9% and 16.5%, respectively, namely, payments of $96.00, $58.00, and $39.00, respectively, for the outstanding balance of $1914.36 discussed above. These minimum payment amounts may be rounded up or down to the nearest dollar amount without departing from the scope of the present invention.

In conclusion, the credit customer is encouraged to make larger payments which represent larger percentages of the outstanding balance in order to qualify for the corresponding lower applied interest rate. The end result desired by the credit provider who utilizes this system would be fewer delinquent accounts.

The tiered interest rate system of the present invention can be utilized with any revolving credit program, including credit card programs, home equity lines of credit, and secured and unsecured lines of credit. Such programs can be used by individuals for home, consumer product and automobile purchases, and by businesses and governmental entities for commercial and agricultural purchases.

While the form of apparatus and method herein described constitute preferred embodiments of this invention, it is to be understood that the invention is not limited to these precise forms of apparatus and methods, and that changes may be made therein without departing from the scope of the invention.

What is claimed is:

1. A data storage medium including machine readable code thereon for use in a computer system or a computer network said computer system or computer network having a system for storing information, and a system for calculating financial information, the storage medium comprising:

means for storing information in a memory device pertaining to a credit customer's account, calculating applied interest and finance charges and transmitting display information about said account, said information selected from a group consisting of a value of an outstanding balance of said account and an amount of a payment transaction pertaining to said account;

means for determining an applied interest rate based on a percentage determined by a ratio determined by the amount of said transaction amount in relation to said account parameter;

means for calculating a finance charge from said applied interest rate; and means for adding said finance charge to said interim outstanding balance to get a new outstanding balance, and storing said new outstanding balance.

2. The data storage medium of claim 1 wherein said means for determining an applied interest rate includes means for matching said percentage to a table of stored percentages, each of said stored percentages corresponding to a selected interest rate, to determine an applied interest rate from said selected interest rates.

3. The data storage medium of claim 1 further comprising:

means for calculating an interim outstanding balance by adjusting said outstanding balance by said transaction amount; and means for calculating a percentage of reduction of said outstanding balance corresponding to said transaction amount.

4. A computer network implemented method for a revolving credit system utilizing a tiered interest rate structure performed on or with aid of a system storing information pertaining to a credit account and calculating applied interest and finance charges, the method comprising:

retrieving a stored first value corresponding to an outstanding balance of said account;

inputting a second value corresponding to a transaction pertaining to said account;

calculating a ratio of said second value to said first value;

determining an interest rate based on said ratio;

determining a finance charge based on said interest rate; and transmitting via the network a new account balance of said account based on said first value and at least one element selected from a group consisting of said finance charge, said interest rate and said ratio.

5. The method of claim 4 wherein said transaction pertaining to said account corresponding to the second inputted value is a payment made on said account.

6. The method of claim 4 wherein said credit account comprises a tiered interest rate credit card.

7. The method of claim 4 wherein said credit account comprises a home equity loan.

8. The method of claim 4 wherein said credit account comprises a line of credit.

9. A method for a revolving credit system utilizing a tiered interest rate structure performed on or with aid of a system storing information pertaining to a credit account and calculating applied interest and finance charges, the method comprising:

retrieving a stored first value from an electronic database corresponding to an outstanding balance of said account;

receiving a second value corresponding to a transaction pertaining to said account;

calculating a ratio of said second value to said first value;

determining an interest rate based on said ratio; and displaying said interest rate.

10. The method of claim 9 said interest rate determined in said step of determining an interest rate depends upon said ratio, a higher ratio providing a lower interest rate.

11. The method of claim 9 further comprising:

determining a finance charge based on said interest rate; and determining a new account balance of said account based on said first value and at least one element selected from a group consisting of said finance charge, said interest rate and said ratio.

12. The method of claim 9 wherein said credit account comprises a tiered interest rate credit card.

13. The method of claim 9 wherein said credit account comprises a home equity loan.

14. The method of claim 9 wherein said credit account comprises a line of credit.

* * * * *